United States Patent [19]

Viola et al.

[11] Patent Number: 5,788,041
[45] Date of Patent: Aug. 4, 1998

[54] CLUTCH FRICTION ELEMENT, NOTABLY FOR A MOTOR VEHICLE

[75] Inventors: Paolo Viola, Paris; Fabrice Tauvron, Creteil, both of France

[73] Assignee: Valeo, Paris, France

[21] Appl. No.: 616,036

[22] Filed: Mar. 14, 1996

[30] Foreign Application Priority Data

Mar. 14, 1995 [FR] France ................... 95 02929

[51] Int. Cl.$^6$ ................ F16D 13/64; F16D 3/66
[52] U.S. Cl. ............... 192/205; 192/211; 192/212; 192/213.12; 464/66; 464/68
[58] Field of Search ................ 192/205, 211, 192/212, 213.12, 70.17, 70.18; 464/66, 68

[56] References Cited

U.S. PATENT DOCUMENTS

| 3,995,726 | 12/1976 | DeGennes . | |
|---|---|---|---|
| 4,223,776 | 9/1980 | Berlioux | 192/70.17 X |
| 4,904,225 | 2/1990 | Worner et al. | 192/205 X |
| 4,944,712 | 7/1990 | Worner et al. | |
| 5,218,884 | 6/1993 | Rohrle | 192/205 X |

FOREIGN PATENT DOCUMENTS

| 0 321 697 | 6/1989 | European Pat. Off. . |
| 2282578 | 3/1976 | France . |
| 2618199 | 1/1989 | France . |
| 2254907 | 10/1992 | United Kingdom . |

Primary Examiner—Richard M. Lorence
Attorney, Agent, or Firm—Longacre & White

[57] ABSTRACT

A clutch friction element having elongate elastic elements (24) interposed circumferentially between two guide washers (18) and a shell (20). Recesses (27), which the shell (20) has for the elongate elements (24), are open radially. The guide washers (18) are connected to each other by an arch (45) and, on the internal surface of this arch, a lining (46) of synthetic material is applied radially.

11 Claims, 2 Drawing Sheets

CLUTCH FRICTION ELEMENT, NOTABLY FOR A MOTOR VEHICLE

BACKGROUND OF THE INVENTION

1. Field of the Invention

The invention concerns clutch friction elements of the type having at least two coaxial parts which are mounted so as to rotate with respect to each other within the limits of a given angular movement and counter to elastic means acting circumferentially, and one of which bears a friction disc, one of the said coaxial parts having two guide washers and the other an intermediate shell between these guide washers, and the elastic means including, distributed in a circular fashion, a plurality of elongate elastic elements each of which is disposed in a housing formed partially by a window in the guide washers and partially by a recess in the shell.

2. Description of the Prior Art

For some applications at least, notably on motor vehicles, a low rigidity is sought for all the elongate elastic elements used, to filter the torsional oscillations coming from the engine and thereby avoid the appearance of noises.

To this end, it has been proposed to use only a small number of such elongate elastic elements, which, in practice, each consist of a spring, of the coil spring type, or two or more such springs disposed coaxially.

But, given their low number, the springs used in this way are relatively long.

They are therefore particularly flexible laterally.

As a result, in use, and under the combined effects of the crushing stress to which they are subject and of the centrifugal force, they very rapidly adopt a curve, as soon as a relatively low rotation speed has been attained by the assembly.

They therefore come into contact very rapidly with the radially outermost circumferential edge of the windows in the guide washers before bearing more violently over its whole length when the rotation speed of the assembly rises.

The drawbacks with such a contact and such a bearing are many.

First of all, the steel-on-steel friction which they entail makes it difficult for there to be a controlled evolution in the hysteresis according to speed and therefore an appropriate control of the precise operating conditions of the assembly.

Furthermore, this steel-on-steel friction is inevitably a source of wear, both for the springs and guide washers and for the rockers through which these springs usually bear circumferentially at their ends.

Finally, the bearing exerted by the springs on the guide washers along the radially outermost circumferential edge of the windows therein is such that an undesirable deformation of these guide washers results, the latter being all the more weakened locally by these windows and therefore flexible at this point, so that, given the great length of the springs, on the one hand, and the fact that, in the usual manner, these springs extend, on the other hand, individually along a chord of the assembly at rest, these windows have, radially, a particularly large opening, notably in their middle area.

The object of the invention is a clutch friction element in which these drawbacks are minimized, if not eliminated, and which, conjointly, affords other advantages.

SUMMARY OF THE INVENTION

This clutch friction element, which is of the type specified above, is, in general terms, characterised in that, conjointly, the recesses which the shell includes for the elongate elastic elements are open radially on the side opposite the axis of the assembly over at least part of their circumferential length, in that there is provided, in line, at least, with each of these recesses, on the periphery with the largest diameter of the guide washers, an arch, which, axially, extends from one to the other of these guide washers, while being integral with them, and which, circularly, extends over the whole circumferential length, at least, of the windows in the guide washers, and in that a lining of synthetic material is applied radially to the internal surface of this arch, over at least part of the circumferential length thereof.

By means of such a lining, which is preferably in the form of a throat, any metal-to-metal friction is eliminated.

It is, in fact, with this lining that the springs constituting the elongate elastic elements make contact in service.

The guide washers are more economical, since they then no longer require heat treatment, nor is it necessary to provide for the presence of any type of grease.

Furthermore, by choosing the synthetic material forming the lining used, optionally containing, if required, any anti-friction material, it is possible to minimize friction, and consequently wear, while improving the control of hysteresis, with even, where required, the possibility of adjusting the latter.

Consequently, since this lining is duly reinforced with an arch, it is possible, if required, in order to further simplify the guide washers, to eliminate any edge forming an eye along the radially outermost circumferential edge of the windows in the guide washers.

Conjointly, this arch advantageously increases the mechanical strength of these guide washers, notably in line with their windows.

By being duly fixed, for example by crimping, to each of the guide washers, this arch can also provide a sufficient axial connection between the guide washers, so that, if required, it is possible to contemplate eliminating the braces usually provided for this purpose.

The corresponding crimping can at the same time advantageously be utilized in order to connect the friction disc to one of the guide washers, without it being necessary, however, to provide it for this purpose with other fixing means of whatever kind such as rivets or others.

The characteristics and advantages of the invention will, moreover, emerge from the description that follows, by way of example, with reference to the accompanying diagrammatic drawings in which:

DETAILED DESCRIPTION OF THE PREFERRED EMBODIMENTS

Figure 1:
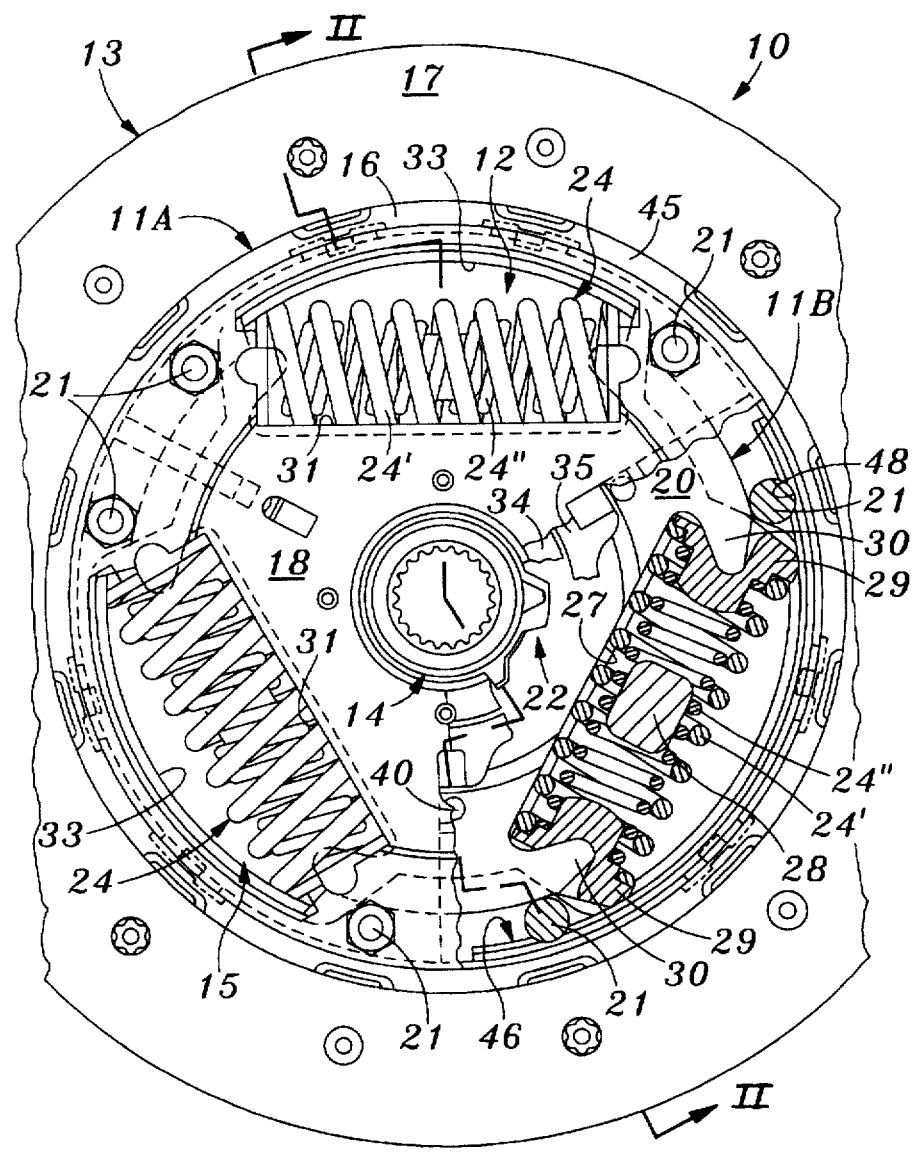
FIG. 1 is, with a local cut-away, a partial view in elevation of a clutch friction element according to the invention.

As illustrated in these figures, and in a manner known per se, the clutch friction element 10 according to the invention includes at least two coaxial parts 11A, 11B which are mounted so as to rotate with respect to each other within the limits of a given angular movement and counter to elastic means 12 acting circumferentially, and one of which, the coaxial part 11A in this case, bears a friction disc 13, the assembly constituting, between this friction disc 13 and a hub 14, a main damper 15 designed to filter the vibrations, in this case a clutch friction element for a motor vehicle, during the operation of the vehicle. The hub 14 is designed to be fixed with respect to rotation on a driven shaft, in this case the input shaft of the gearbox.

The friction disc 13, forming the input component of the friction element 10, includes a thin shell 16, optionally divided into blades and carried fixedly, by bonding and/or riveting, by this thin shell 16, extending on each side thereof, two friction linings 17. These linings 17 are designed in this case to be clamped between the thrust and reaction plates of the clutch which are fixed with respect to rotation to a driving shaft (the engine crankshaft).

One of the coaxial parts 11A, 11B, in this case the coaxial part 11A bearing the friction disc 13, has two guide washers 18, and the other, in this case the part 11B, a thick shell 20, intermediate between the guide washers 18 and at a distance therefrom.

In this case, the guide washers 18 are, from place to place, connected to each other by braces 21, which act in the vicinity their periphery with the largest diameter, recessed with respect thereto, but radially beyond the periphery with the largest diameter of the shell 20, and which extend substantially parallel to the axis of the assembly.

These braces 21 also serve to fix the thin shell 16 attached to one of the guide washers. In this case, these braces 21 are bolted.

As a variant and preferably, they are crimped.

In this case, the braces 21 have a circular cross section and only a small clearance separates them from the periphery with the largest diameter of the shell 20.

The guide washers 18 extend freely around the hub 14, forming the output component of the friction element 10.

On the other hand, at its periphery with the smallest diameter, the shell 20 meshes with the hub 14 with clearance by means of means of meshing with clearance 22.

In this case, the elastic means 12 acting circumferentially between the coaxial parts 11A, 11B include, distributed circularly, a plurality of elongate elastic elements 24 which all extend substantially tangentially to one and the same circumference of the assembly, and each one of which is disposed in a housing 25 formed partly by a window 26 in the guide washers 18 and partially by a recess 27 in the shell 20.

In this case, these elongate elastic elements 24 are three in number and each consist of two springs 24', 24" of the coil spring type, disposed coaxially one inside the other with, mounted so as to float in the central area of the innermost spring 24", a block of elastic material 28.

In this case, the elongate elastic elements 24 bear, circumferentially, at their ends, on rockers 29 which, for the idle configuration of the assembly, which is the one depicted, are each engaged so as to pivot, by virtue of a hollowing in the fingers 30 which the shell 20 forms circumferentially so as to project towards the inside of the housings 25.

In this case, these rockers 29 are made of a synthetic material, in order to reduce noises and friction.

For the idle configuration depicted, the elongate elastic elements 24 extend substantially straight, each individually a long a chord of the assembly.

As a result of this, the radially innermost circumferential edge 31 of the windows 26 in the guide washers 18 is itself straight, and the same is true of the radially innermost circumferential edge of the recesses 27 in the shell 20.

Conversely, the radially outermost circumferential edge 32 of the windows 26 in the guide washers 18 extends in a circular manner.

Figure 3:
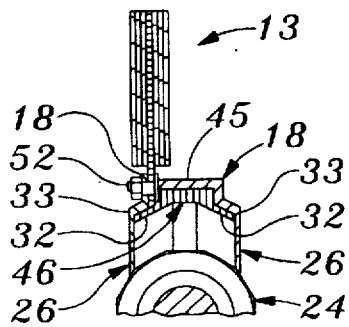
FIGS. 3, 4 and 5 are partial views in axial section which, partly repeating that in FIG. 2, each correspond respectively to various variant embodiments.
Figure 2:
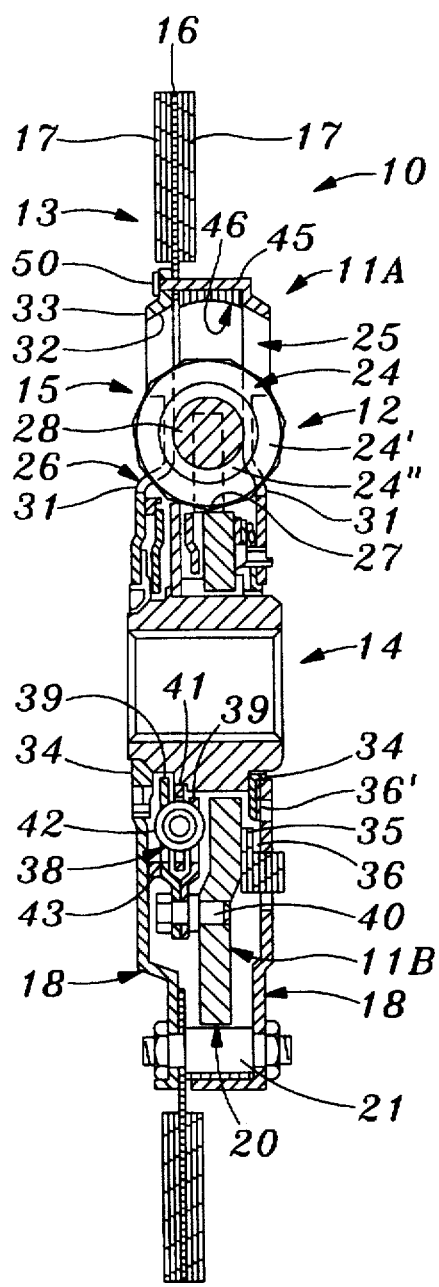
FIG. 2 is a view in axial section, along the broken line II—II in FIG. 1.

In FIGS. 1 to 3, the guide washers 18 include a rim 33, forming an eye, projecting outwards along this radially outermost circumferential edge 32 of their windows 26, over the whole length of it.

Figure 4:
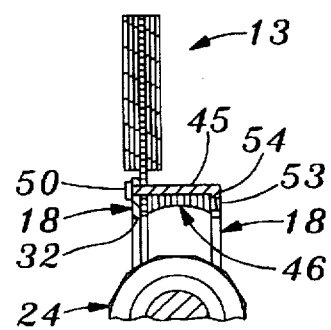
Figure 5:
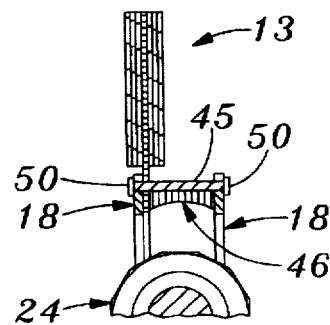

In FIGS. 4 and 5, this rim has, conversely, been eliminated.

In order to obtain a certain hysteresis, friction means acting axially are also provided within the main damper 15.

In this case, these friction means include, on the one hand, a friction washer 34, which acts, radially and/or axially, between each of the guide washers 18 and the hub 14, while being fixed with respect to rotation to the guide washer 18, and, on the other hand, a friction washer 35, which acts axially between the guide washer 18 and the shell 20, while being fixed with respect to rotation to the guide washer 18 and being forced by an elastic washer 36 in the direction of the shell 20. The washer 34 is forced in the direction of the hub 14 by an elastic washer 36'. In this case, the washers 36, 36' consist of Belleville washers, the washer 36' exerting a lower load than that exerted by the washer 36.

In this case, the clutch friction 10 also includes an auxiliary damper 38, or predamper.

This auxiliary damper 38 has, in this case, two guide washers 39, which are conjointly fixed with respect to rotation to the shell 20 of the main damper 15 by pins 40 each engaged in an opening in this shell 20, a shell 41, which is fixed with respect to rotation on the hub 14, in this case by crimping and, acting circumferentially between these guide washers 39 and this shell 41, springs 42. The springs 42 have a lower stiffness than that of the elastic elements 24, the auxiliary damper serving to filter vibrations during the idling of the vehicle engine.

In this case, this auxiliary damper 38 is disposed radially below the elastic means 12 and axially between the shell 20 of the main damper 15 and one of the guide washers 18 thereof and, between the latter and its own guide washer 39 closest to it, there acts, axially, a friction washer 43.

The elastic washer 36 of the main damper 15 therefore enables the assembly formed by the auxiliary damper 38 and the friction washer 43 to be clamped axially between the shell 20 and the guide washer 18 in question.

The friction washer 43 avoids metal-to-metal contact between the auxiliary damper 38 and the guide washer 18.

It will be noted that the guide washers 39 are identical overall, one being extended at its internal periphery with respect to the other. These washers 39 have lugs on their external periphery by means of which they are connected to each other and are joined so as to be fixed mutually by the pins 40 with a shouldered head in contact with the intermediate shell 20. This head forms a brace between the shell 20 and the washers 39.

More precisely, this pin has, beyond its bracing head, a shaft passing through the aforementioned lugs which have holes for this purpose. The shaft can be threaded, and in this case a nut is provided to clamp the lugs between it and the head of the pin. As a variant, the shaft is smooth, and the free end of the shaft is riveted.

It will be appreciated that the lugs are connected to the main part of the washers 39 by an inclined part. The lugs are therefore axially offset with respect to the main part of the washers. They extend radially beyond the shell 41 fixed by means of clamping to the hub 14 having on its external periphery alternating teeth—forming fluting in this case—and trapezoidal recesses (FIG. 1) engaged with circumferential clearance in recesses and teeth formed on the internal periphery of the intermediate shell 20 to form means 22 of meshing with clearance acting between the hub 14 (the external periphery thereof) and the intermediate shell 20 (the internal periphery thereof).

The lugs extend in the plane of the shell 41 so that the springs 42, in this case coil springs, or as a variant elastomer blocks, are driven symmetrically and operate correctly.

Of course, the shell 41 and the washers 39 have mutually opposite windows for the fitting of circumferentially acting springs 42.

By means of these arrangements, the washers 39 are standardized and it is possible to form simply, in advance, a hub 14/auxiliary damper 38 assembly with the pins 40. The washers 39 are advantageously made of metal.

In this case, no contact occurs between the shell 20 and the nearest flange 39. The clamping force of the washer 43 is passed on by means of the shouldered pins 40.

In this case, the fixing with respect to rotation of the friction washers 34 and 35, advantageously made of a synthetic material, is moreover effected by projections, which, provided for this purpose on these friction washers 34 and 35, are engaged in corresponding openings in the guide washers 18.

According to the invention, and conjointly, the recesses 27 which the shell 20 of the main damper 15 has for the elongate elastic elements 24 are open radially on the side opposite the axis of the assembly over at least part of their circumferential length, there is provided, in line, at least, with each of these recesses 27, on the periphery with the largest diameter of the guide washers 18, an arch 45, which, axially, extends from one to the other of these guide washers 18, while being fixed to them, and which, circularly, extends over the whole circumferential length, at least, of the windows 26 in the guide washers 18, and a lining 46 of synthetic material is applied radially to the internal surface of this arch 45, over at least part of the circumferential length thereof.

In this case, the recesses 27 in the shell 20 are open radially over their whole circumferential length, beyond the fingers 30 formed by this shell 20.

In this case, the lining 46 has, on the inside, a curved transverse profile, in the manner of a throat.

Preferably, this transverse profile is circular.

The lining 46 thus matches the circular shape of the turns of the outermost spring 24' of the elongate elastic elements 24.

In this case, the lining 46 is inserted radially between at least one brace 21 and the arch 45, on each side of the windows 26 in the guide washers 18.

The lining 46 has, transversely, a slot 48 for the passage of each brace 21. The shape of the slots 48 is complementary to that of the braces 21.

The lining 46 is thus held radially and circumferentially in this case by the braces 21, both at rest and during operation.

In this case, there is a lining 46 for each elongate elastic element 24, and this lining 46 projects circumferentially from each side of the corresponding housing 25, while being engaged on a brace 21 at each of its ends.

On the other hand, the arch 45 extends circularly right round the axis of the assembly, in a continuous or substantially continuous manner.

For example, in FIGS. 1 to 4, the arch 45 is of a single piece with one of the guide washers 18, in this case the one which is axially furthest from the friction disc 13.

It then forms a circularly continuous rim on the periphery with the largest diameter of this guide washer 18, substantially parallel to the axis of the assembly.

Conjointly, it is crimped to the other guide washer 18 by brackets 50 which it has for this purpose from place to place on its edge.

Through these brackets 50, the arch 45 passes locally through the friction disc 13, the latter, and more precisely its thin shell 16, being axially squeezed between this arch 45 and the guide washer 18 bearing it.

This can be enough to fix the friction disc 13, and this is the case in FIGS. 1, 2, 4 and 5. Thus in FIGS. 1 and 2, if required, the braces 21 can pass through the disc 16.

As a variant, it is possible to provide, for this fixing, specific additional rivets 52, and this is the case in FIG. 3.

In any event, the guide washers 18 form, with the arch 45 which connects them, an advantageously rigid casing.

During operation, the elongate elastic elements 24 come to bear radially upon the lining 46 associated with them.

In practice, the latter is, circumferentially, of sufficient length to still be operational at the limits of the angular movement of the two coaxial parts 11A, 11B.

It will be noted that, on their edge which is radially most distant from the axis of the assembly, the rockers 29 have a rounded external surface, corresponding to the profile of the lining 46.

These rockers 29 enable the elongate elastic elements 24 to work under excellent conditions and come into contact with the lining 46.

During a first phase of the relative angular movement of the hub 14 and the friction disc 13, the auxiliary damper 38 acts, while the main damper 15 forms a block, since the elongate elastic elements 24 are stiffer than the springs 42.

Once the circumferential clearance has been taken up in the means of meshing with clearance 22, the teeth of the shell 20 engage with the teeth of the hub 14 and the shell 20 becomes integral with respect to rotation with the hub 14, a relative angular movement is then produced between this shell 20 and the guide washers 18, with the action of the elongate elastic elements 24.

A large relative angular movement is thus obtained between the shell 20 and the guide washers 18, this angular movement being made possible by the recesses 27 in the shell 20, the arch 45 and the lining 46.

In association with the rockers 29, the fingers 30 of the shell 20 permit easy compression of the elongate elastic elements 24.

The blocks of elastic material 28 form end-of-travel stops, cooperating with the rockers 29.

In order to hold and centre the springs 24', 24", the rockers 29 have a supported stud, FIG. 1, by which they engage in these springs 24', 24", thereby providing them with a support.

In FIG. 3, the lining 46 associated with each of the elongate elastic elements 24 extends transversely on the rims 33 forming eyes, in the guide washers 18.

In FIG. 4, it includes laterally, projecting, along at least one of its edges, at least one toe 53, by which it is engaged with a perforation 54 in the nearest guide washer 18, in this case the guide washer 18 which is axially furthest from the friction disc 13.

Provided in sufficient numbers, such toes 53 can suffice to hold the linings 46 radially and circumferentially.

Given, moreover, the axial connection provided by the arch 45, and the mechanical reinforcement which it affords, the braces 21 can, in this case, be eliminated.

In FIG. 5, the arch 45 forms a component which is distinct from each of the guide washers 18, and it is crimped by brackets 50 on each of the latter.

But, as before, it forms overall a casing with guide washers 18.

Of course, the present invention is not limited to the embodiments described and depicted, but encompasses any variant embodiment and/or combination of their various elements.

We claim:

1. A clutch friction element of the type having at least two coaxial parts (11A, 11B), which are mounted so as to rotate with respect to each other within the limits of a given angular movement and counter to elastic means (12) acting circumferentially, and one of which bears a friction disc (13), one (11A) of these coaxial parts (11A, 11B) having two guide washers (18) and the other (11B) an intermediate shell (20) between these guide washers (18), and the elastic means (12) including, distributed in a circular fashion, a plurality of elongate elastic elements (24) each of which is disposed in a housing (25) formed partially by a window (26) in the guide washers (18) and partially by a recess (27) in the shell (20), wherein, conjointly, the recesses (27) which the shell (20) includes for the elongate elastic elements (24) are open radially on the side opposite the axis of the assembly over at least part of their circumferential length, in that there is provided, in line, at least, with each of these recesses (27), on the periphery with the largest diameter of the guide washers (18), an arch (45), which, axially, extends from one to the other of these guide washers (18), while being integral with them, and which, circularly, extends over the whole circumferential length, at least, of the windows (26) in the guide washers (18), and in that a lining (46) of synthetic material is applied radially to the internal surface of this arch (45), over at least part of the circumferential length thereof, and with the guide washers (18) being, from place to place, connected to each other by braces (21), which extend substantially parallel to the axis of the assembly and which, radially, are recessed with respect to the periphery with the largest diameter of these guide washers (18), the lining (46) applied to the arch (45) is inserted radially between at least one such brace (21) and this arch (45), on each side of the windows (26) in the guide washers (18).

2. Clutch friction element according to claim 1, wherein, the lining (46) has, on the inside, a curved transverse profile.

3. Clutch friction element according to claim 1, wherein, with the guide washers (18) including a rim (33) projecting outwards along the radially outermost circumferential edge (32) of their windows (26), the lining (46) extends transversely on this rim (33).

4. A clutch friction element according to claim 1, wherein the elongate elastic elements (24) bear, circumferentially, at their ends, on rockers (29) which are each engaged so as to pivot an fingers (30) which the shell (20) forms circumferentially so as to project towards the inside of the housings (25).

5. A clutch friction element according to claim 1, wherein the lining (46) has, transversely, a slot (48) for the passage of a brace (21).

6. A clutch friction element according to claim 1, wherein, along at least one of its edges, the lining (46) includes laterally, projecting, at least one toe (53) by which it engages with a perforation (54) in the corresponding guide washer (18).

7. A clutch friction element according to claim 1, wherein there is one lining (46) per elongate elastic element (24), and this lining (46) projects circumferentially on each side of the corresponding housing (25).

8. A clutch friction element according to claim 1, wherein the arch (45) is of a single piece with one of the guide washers (18), and, through brackets (50) projecting from place to place on its edge, it is crimped to the other guide washer.

9. A clutch friction element according to claim 1, wherein, forming a component which is distinct from each of the guide washers (18), the arch is crimped by brackets (50) on each of the latter.

10. A clutch friction element according to claim 1, wherein, through brackets (50), the arch, (45) passes locally through the friction disc (13), the latter being axially squeezed between this arch (45) and one of the guide washers (18).

11. A clutch friction element according to claim 1, wherein the arch (45) extends circularly right round the axis of the assembly.

* * * * *